United States Patent [19]

Lihl et al.

[11] Patent Number: 5,621,565
[45] Date of Patent: Apr. 15, 1997

[54] PROTRACTION DEVICE FOR A MEASURING MICROSCOPE

[75] Inventors: Reinhardt Lihl; Kurt Salzmann; Gerhold Garkisch, all of Vienna, Austria

[73] Assignee: Leica AG, Vienna, Austria

[21] Appl. No.: 538,955

[22] Filed: Oct. 4, 1995

[51] Int. Cl.⁶ ................................................. G01B 9/04
[52] U.S. Cl. ................................................. 359/368; 356/140
[58] Field of Search ............................. 359/368, 397; 356/138, 140; 250/237 G

[56] References Cited

U.S. PATENT DOCUMENTS

| | | | |
|---|---|---|---|
| 4,172,639 | 10/1979 | Lang et al. | 351/13 |
| 4,568,188 | 2/1986 | Weber et al. | 359/368 |
| 4,695,304 | 9/1987 | Leitz et al. | 356/140 |
| 4,760,429 | 7/1988 | O'Connor | 355/77 |
| 4,770,518 | 9/1988 | Emmel | 359/385 |
| 5,173,601 | 12/1992 | Franz | 250/237 G |
| 5,365,667 | 11/1994 | Golding | 33/201 |

*Primary Examiner*—Jon W. Henry
*Attorney, Agent, or Firm*—Bean, Kauffman & Spencer

[57] ABSTRACT

A protraction device for a measuring microscope comprises a reticle aligned on an optical path of the microscope at an intermediate image plane thereof and adapted for rotation about a central axis, and an angle encoder operably coupled to the reticle such that when the angle encoder is rotated about its rotational axis, a corresponding rotation is produced in the reticle. The angle encoder provides a signal representative of an angular displacement of the reticle which is delivered to a printer, digital display, or the like.

18 Claims, 2 Drawing Sheets

PROTRACTION DEVICE FOR A MEASURING MICROSCOPE

BACKGROUND OF THE INVENTION

A. Field of the Invention

The present invention relates generally to the field of measuring microscopes, and more particularly to a protraction device for measuring microscopes having a rotatable reticle connected to an angle encoder for measurement of angles.

B. Description of the Prior Art

Measuring microscopes are used mainly for two-dimensional measurements, usually of a distance between two points on a microscopic object. However, measurement of an angle associated with a microscopic object is often of great importance. Heretofore, angular measurements have been made possible by removal of a microscope binotube and installation of a rotatable eyepiece having a specially marked reticle. Another well-known design for angular measurement includes an enlarged rotatable reticle disc having angle markings at a radially outer portion thereof which may be viewed by a user with the help of a magnifying glass. A further prior art protraction device comprises a permanently mounted rotatable reticle and means for selectively reflecting an image of the reticle into the eyepiece.

SUMMARY OF THE INVENTION

Therefore, it is an object of the present invention to provide a protraction device for a measuring microscope which obviates the need for replacement of the microscope binotube with a rotatable eyepiece.

It is another object of the present invention to provide a protraction device which is modular in nature to enable same to be purchased as an optional feature.

It is a further object of the present invention to provide a protraction device which may be set to a zero value to obviate the need to subtract one measurement value from another.

Briefly, the present invention comprises a reticle positioned in an intermediate image plane of a microscope and rotatable about a central axis thereof aligned with an optical path of the microscope, and an angle encoder operably coupled to the reticle such that when the angle encoder is rotated about its axis, a corresponding rotation is produced in the reticle. The angle encoder thus provides a signal representative of an angular displacement of the reticle resulting. The signal may be provided to indicator means, which may be reset to zero prior to measurement. The reticle and angle encoder are preferably mounted on an optional slide module adapted to be received by a microscope, however the invention may also be practiced by providing it as a permanent feature of a microscope.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
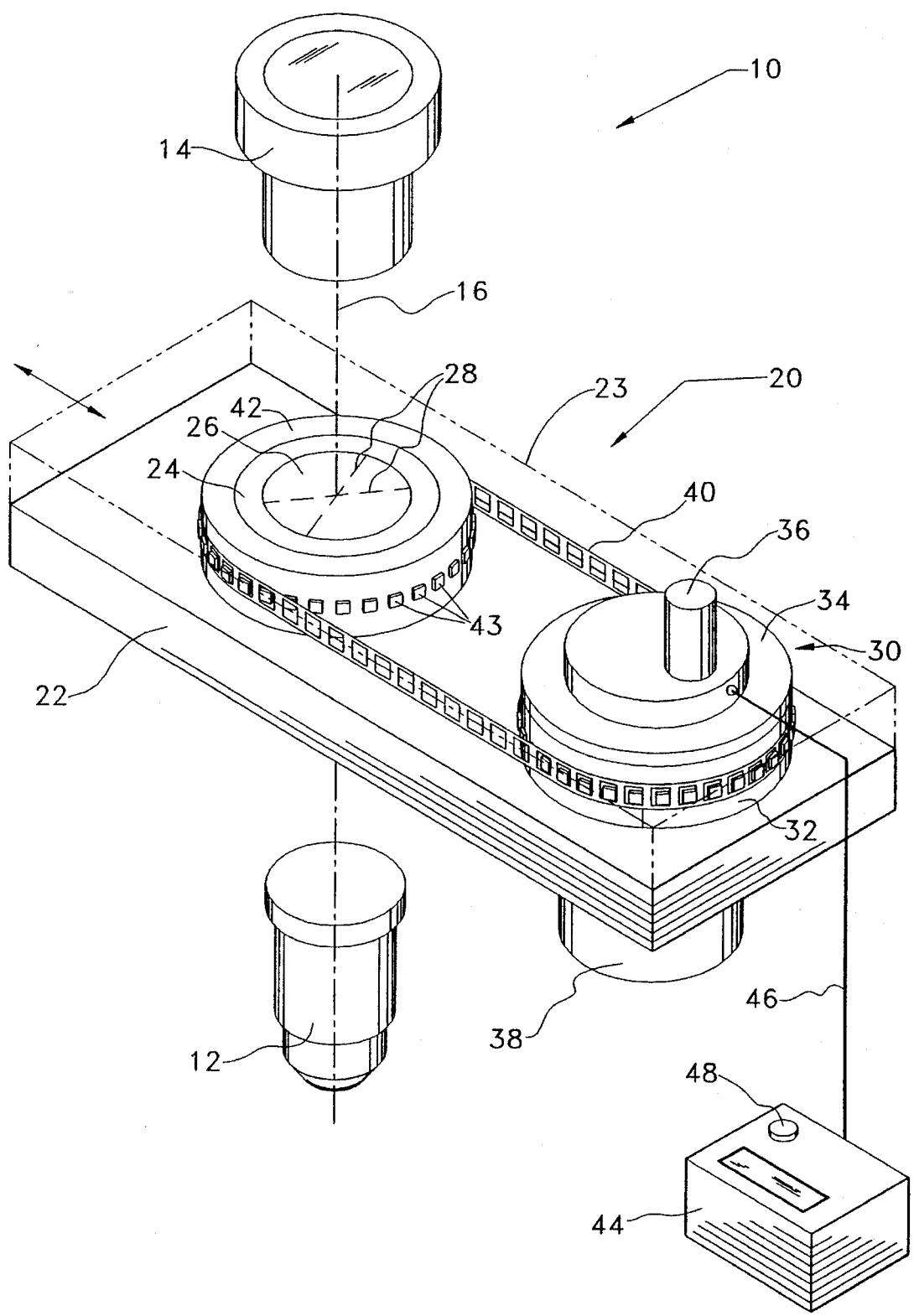
FIG. 1 is a perspective view of a protraction device formed in accordance with a preferred embodiment of the present invention shown in conjunction with a schematically represented measuring microscope and indicator means.

A measuring microscope is represented schematically in FIG. 1 and is generally identified by the reference numeral 10. Microscope 10 is depicted as including an objective lens 12 and a magnifying eyepiece 14 centered on an optical path 16, elements familiar in the microscope art.

Figure 2:
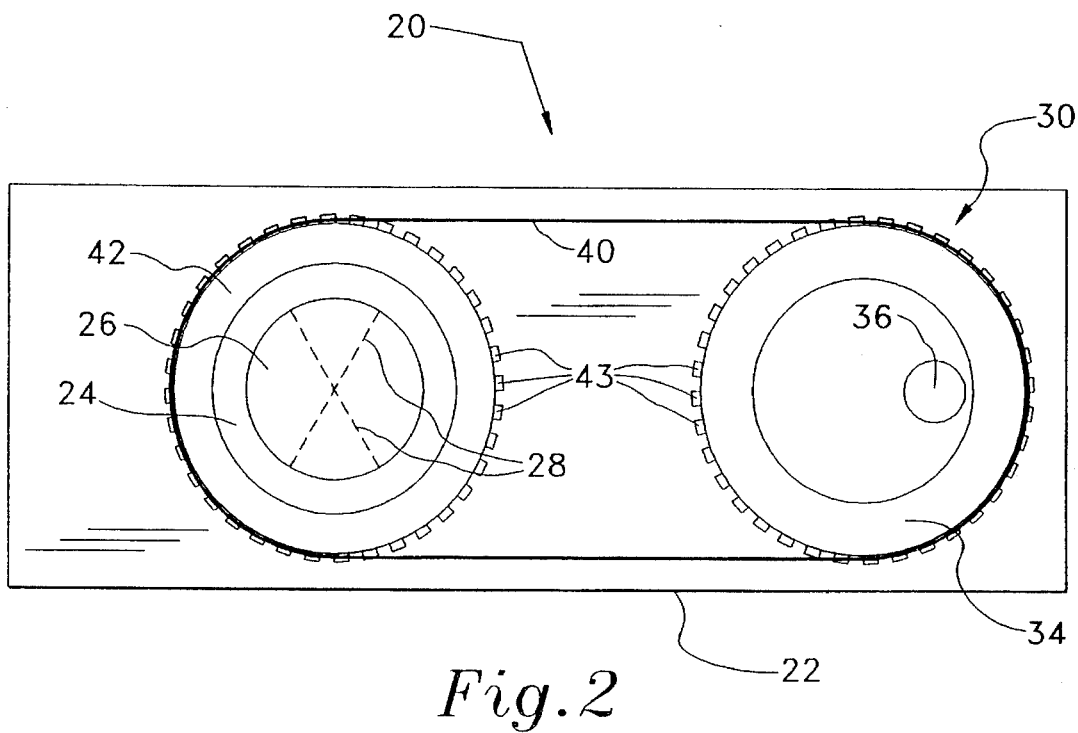
FIG. 2 is a top plan view thereof.

In accordance with a preferred embodiment of the present invention depicted in FIGS. 1 and 2, a protraction device 20 for use with microscope 10 comprises a slide module 22 adapted for receipt within a slide channel or clearance (not shown) in microscope 10, a cover 23 shown in phantom line, a reticle frame 24 rotatably mounted on slide module 22 to support a circular reticle 26 for rotation about a central axis thereof, and an angle encoder 30 connected to reticle 26, as described hereinafter, for generating a signal representative of an angular displacement of the reticle. Slide module 22 enables reticle 26 to be positioned orthogonal to optical path 16 at an intermediate image plane of microscope 10 the rotational axis of reticle 26 in alignment with optical path 16. Reticle 26 includes reference markings, such as a pair of diametrical reference lines 28 offset sixty degrees from each other. It is preferred that frame 24 be configured to temporarily hold reticle 26 so that a user may exchange reticles if different reference markings are desired or if reticle 26 becomes damaged or dirty.

Angle encoder 30 includes a circular wheel 32 and a circular disk 34 fixed for rotation with wheel 32 about a central axis thereof, and a reader 36 for sensing angle codings (not shown) provided on disk 34 to generate an angular displacement signal. Angle encoder 30 may be optical in nature, whereby disk 34 is transparent with opaque angle codings thereon, however it is also possible to use a magnetic angle encoder. A hand knob 38 connected to wheel 32 permits manual rotation of disk 34.

In the preferred embodiment, angle encoder 30 is connected to reticle 26 by a continuous transmission belt 40 engaging wheel 32 and a radially outer portion 42 surrounding frame 24. To prevent slipping, transmission belt 40 may be a notched belt arranged to mate with teeth 43 provided at the periphery of outer portion 42 and wheel 32. In this way, disk 34 and reticle 26 are operatively coupled together such that when disk 34 is rotated through an angular displacement using hand knob 38, a corresponding rotation of reticle 26 about its rotational axis through an equivalent angular displacement is produced. Consequently, when disk 34 and reticle 26 are rotated about their respective axes by operation of knob 38, angle encoder 30 generates a signal representative of the angular displacement through which reticle 26 is rotated.

An indicator unit 44, shown schematically in FIG. 1, is connected to angle encoder 30 by wire 46 to receive the angular displacement signal generated by angle encoder 30 and display an angular displacement value. Indicator unit 44 may be a printer, digital display, or other means of communicating the angular displacement value to a user, and preferably includes reset means 48 for resetting the indicator unit to a zero reference value prior to making a measurement.

Figure 3:
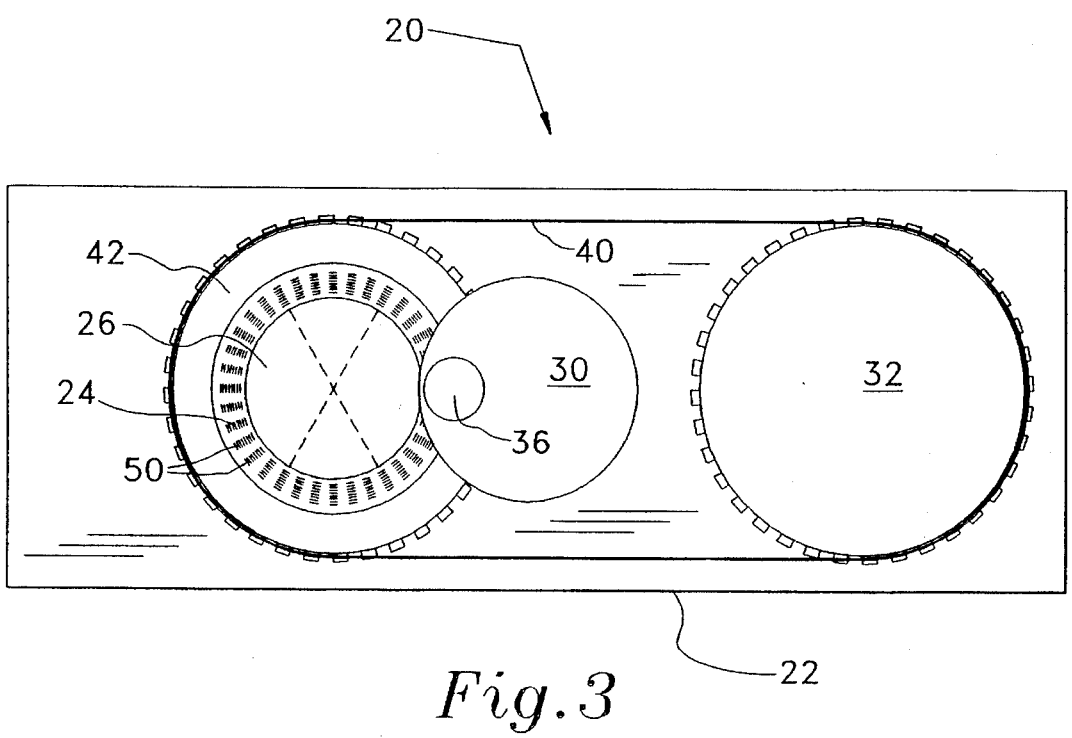
FIG. 3 is a top plan view of a protraction device formed in accordance with an alternative embodiment of the present invention.

An alternative embodiment of the present invention is shown in FIG. 3. The alternative embodiment differs from the previously described preferred embodiment in that the codings sensed by angle encoder 30 are located at a peripheral region of reticle 26, or on frame 24, rather than on separate disk 34, and angle encoder 30 is optically or magnetically connected to reticle 26. The angle codings are represented in FIG. 3 by lines 50 on reticle frame 24, with reader 36 of angle encoder 30 being located in a position for sensing angle codings 50.

Where codings 50 are located on frame 24 or on reticle 26, it is conceivable that angle encoder 30 and reader 36 may be permanently built into microscope 10, as opposed to being supported by slide 22. It is also contemplated to provide permanent means for rotatably and exchangeably supporting reticle 26 on microscope 10 for cooperation with permanent angle encoder means.

In order to perform an angular measurement using the present invention, a user would operate knob 38 to rotate reticle 26 to a start position wherein a reference line 28 appears superimposed at a selected location on the object image, activate reset means 48, and then once again operate knob 38 to rotate reticle 26 through an angle to be measured until the reference line 28 appears superimposed at a second selected location on the object image. The desired angular displacement value is automatically reported by indicator unit 44.

What is claimed is:

1. A protraction device for a measuring microscope comprising:

a slide module adapted to be received by said microscope;

a reticle supported on said slide module for rotation about a first axis, said slide module enabling said reticle to be selectively positioned at an intermediate image plane of said microscope orthogonal to an optical path of said microscope with said first axis in alignment with said optical path;

a disk supported on said slide module apart from said reticle and mechanically coupled to said reticle for corresponding rotation therewith said disk having angle codings thereon;

manual means for rotating said disk and said reticle through an angular displacement; and angle encoder means for reading said angle codings and providing a signal representative of said angular displacement.

2. The protraction device according to claim 1, wherein said reticle is exchangeably held by reticle support means rotatably mounted on said slide module.

3. The protraction device according to claim 1, wherein said manual means for rotating said disk and reticle is a knob connected to said disk.

4. The protraction device according to claim 2, wherein said disk is mechanically coupled to said reticle by a continuous non-slipping transmission belt.

5. The protraction device according to claim 4, wherein said belt is a notched belt for engaging peripheral teeth on said disk and said reticle support means.

6. The protraction device according to claim 1, further including indicator means connected to said angle encoder means for receiving said signal and displaying said angular displacement.

7. The protraction device according to claim 6, wherein said indicator means is a printer.

8. The protraction device according to claim 6, wherein said indicator means is a digital display.

9. The protraction device according to claim 6, wherein said indicator means may be set to a zero reference value.

10. A protraction device for a measuring microscope comprising:

a slide module adapted to be received by said microscope;

reticle support means including a reticle frame rotatably mounted to said slide module for rotation about a first axis, said reticle frame having angle codings thereon;

a reticle supported by said reticle frame for rotation about said first axis, said slide module enabling said reticle to be selectively positioned at an intermediate image plane of said microscope orthogonal to an optical path of said microscope with said first axis in alignment with said optical path;

a wheel supported on said slide module apart from said reticle and mechanically coupled to said reticle support means for corresponding rotation therewith;

manual means for rotating said wheel, said reticle support means, and said reticle through an angular displacement; and angle encoder means for reading said angle codings and providing a signal representative of said angular displacement.

11. The protraction device according to claim 10, wherein said reticle is exchangeably held by said reticle frame.

12. The protraction device according to claim 10, wherein said manual means for rotating said wheel and said reticle support means is a knob connected to said wheel.

13. The protraction device according to claim 11, wherein said wheel is mechanically coupled to said reticle support means by a continuous non-slipping transmission belt.

14. The protraction device according to claim 13, wherein said belt is a notched belt for engaging peripheral teeth on said disk and said reticle support means.

15. The protraction device according to claim 10, further including indicator means connected to said angle encoder means for receiving said signal and displaying said angular displacement.

16. The protraction device according to claim 15, wherein said indicator means is a printer.

17. The protraction device according to claim 15, wherein said indicator means is a digital display.

18. The protraction device according to claim 15, wherein said indicator means may be set to a zero reference value.

* * * * *